United States Patent
Jeanne et al.

(10) Patent No.: US 12,045,110 B2
(45) Date of Patent: Jul. 23, 2024

(54) METHOD FOR CONTROLLING A DEVICE AND CORRESPONDING DEVICE, ELECTRONIC ASSEMBLY, SYSTEM, COMPUTER READABLE PROGRAM PRODUCT AND COMPUTER READABLE STORAGE MEDIUM

(71) Applicant: INTERDIGITAL MADISON PATENT HOLDINGS, SAS, Paris (FR)

(72) Inventors: Ludovic Jeanne, Montreuil sur Ille (FR); Jean-Pierre Bertin, Guemene Penfao (FR); Frederic Grenier, Chantepie (FR); Philippe Launay, Rennes (FR); Philippe Marchand, Vitre (FR)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 30 days.

(21) Appl. No.: 16/492,595

(22) PCT Filed: Feb. 22, 2018

(86) PCT No.: PCT/EP2018/054358
§ 371 (c)(1),
(2) Date: Sep. 9, 2019

(87) PCT Pub. No.: WO2018/162244
PCT Pub. Date: Sep. 13, 2018

(65) Prior Publication Data
US 2020/0393886 A1 Dec. 17, 2020

(30) Foreign Application Priority Data

Mar. 10, 2017 (EP) .................................. 17305262

(51) Int. Cl.
*G06F 1/28* (2006.01)
*G06F 1/26* (2006.01)
(Continued)

(52) U.S. Cl.
CPC ................ *G06F 1/28* (2013.01); *G06F 1/266* (2013.01); *H04N 21/4424* (2013.01); *H04N 21/4436* (2013.01)

(58) Field of Classification Search
None
See application file for complete search history.

(56) References Cited

U.S. PATENT DOCUMENTS 4,870,696 A * 9/1989 Yorita .................... H04M 1/733
455/500
6,023,612 A * 2/2000 Harris ..................... H03F 1/526
455/127.1
(Continued)

FOREIGN PATENT DOCUMENTS

EP 2830204 A1 1/2015
JP H11305880 A 11/1999
(Continued)

OTHER PUBLICATIONS

JPH11305880 A, Translated "USB Equipment and USB Hub Device" Nov. 5, 1999.
(Continued)

*Primary Examiner* — Jaweed A Abbaszadeh
*Assistant Examiner* — Cheri L Harrington
(74) *Attorney, Agent, or Firm* — Klintworth & Rozenblat IP LLP

(57) ABSTRACT

The present disclosure relates to a method, adapted to be implemented in an electronic device adapted to be powered by a power source, the method comprising monitoring a variation of an input voltage and/or an input current received
(Continued)

from the power source while the electronic device is powered by the power source; and aborting, according to the monitored variation, a first action performed by a power consuming component of the electronic device. The present disclosure also relates to corresponding device, system, computer readable program product and computer readable storage medium.

13 Claims, 8 Drawing Sheets

(51) Int. Cl.
  *H04N 21/44*  (2011.01)
  *H04N 21/442* (2011.01)
  *H04N 21/443* (2011.01)

(56) References Cited

U.S. PATENT DOCUMENTS

| | | | | |
|---|---|---|---|---|
| 6,529,712 | B1* | 3/2003 | Domino | H04W 88/04 |
| | | | | 455/318 |
| 9,465,393 | B2 | 10/2016 | Chou et al. | |
| 9,568,511 | B2* | 2/2017 | Ravezzi | G01R 19/16552 |
| 10,379,874 | B1* | 8/2019 | Venkatasamy | G06F 1/3212 |
| 10,581,478 | B1* | 3/2020 | Tam | H04B 1/0458 |
| 11,258,494 | B1* | 2/2022 | Sitaram | H04W 24/08 |
| 2004/0213335 | A1* | 10/2004 | Forest | H03F 1/0261 |
| | | | | 375/219 |
| 2006/0030266 | A1* | 2/2006 | Desai | H04W 84/12 |
| | | | | 455/74 |
| 2006/0199602 | A1* | 9/2006 | Zinn | H04W 52/48 |
| | | | | 455/522 |
| 2007/0142081 | A1* | 6/2007 | Lindqvist | H04W 52/0274 |
| | | | | 455/556.1 |
| 2007/0192643 | A1 | 8/2007 | Li et al. | |
| 2010/0133908 | A1 | 6/2010 | Weng | |
| 2010/0303000 | A1* | 12/2010 | Shiizaki | H04B 7/15557 |
| | | | | 370/315 |
| 2011/0022867 | A1* | 1/2011 | Chang | G06F 1/3218 |
| | | | | 713/323 |
| 2013/0094414 | A1* | 4/2013 | Park | H04W 52/0216 |
| | | | | 370/311 |
| 2013/0154381 | A1* | 6/2013 | Cain | G06F 1/3203 |
| | | | | 307/104 |
| 2015/0044964 | A1* | 2/2015 | Khan | G06F 1/3278 |
| | | | | 455/41.1 |
| 2015/0127960 | A1* | 5/2015 | Mao | G06F 1/32 |
| | | | | 713/320 |
| 2016/0170472 | A1 | 6/2016 | Cosaro | |
| 2016/0321070 | A1* | 11/2016 | Okazaki | G06F 1/3287 |
| 2018/0324860 | A1* | 11/2018 | Mattsson | H04B 17/318 |

FOREIGN PATENT DOCUMENTS

| | | |
|---|---|---|
| JP | 2000278199 A | 10/2000 |
| JP | 2004127020 A | 4/2004 |
| JP | 2010160651 A | 7/2010 |

OTHER PUBLICATIONS

JP2004127020 A, Translated "Power Supply Device for USB Interface Connector" Apr. 22, 2004.

JP2010160651 A, Translated "Storage Device and Adapter Therefor" Jul. 22, 2010.

* cited by examiner

METHOD FOR CONTROLLING A DEVICE AND CORRESPONDING DEVICE, ELECTRONIC ASSEMBLY, SYSTEM, COMPUTER READABLE PROGRAM PRODUCT AND COMPUTER READABLE STORAGE MEDIUM

This application is a national stage application under 35 U.S.C. § 371 of International Application PCT/EP2018/054358, filed Feb. 22, 2018, which was published in accordance with PCT Article 21(2) on Sep. 13, 2018, in English, and which claims the benefit of European Patent Application No. 17305262.2, filed on Mar. 10, 2017.

1. TECHNICAL FIELD

The present disclosure relates to the field of electronic devices, notably communication devices like wireless communication devices, and/or electronic devices used for processing audio and/or video contents, like communication devices used for transmitting an audio and/or video content to a rendering device, like a TV, a display or an audio renderer.

A method for controlling an electronic device and corresponding device, electronic assembly, system, computer readable program product and computer readable storage medium are described.

2. BACKGROUND ART

Local or domestic environments often encompass many communication devices, for processing (for instance acquiring, receiving, transmitting and/or rendering) an audio and/or video content. Such communication devices can include inter-communication devices (like gateways or repeaters), and end-devices like set-top-boxes (STB), smartphones, tablets, personal computers or peripherals like speakers (or audio renderers) or microphones that have become widely used nowadays.

There is need for a solution that can help enhancing the user experience of a device.

3. SUMMARY

The present principles enable at least one of the above disadvantages to be resolved by proposing a method adapted to be implemented in an electronic device adapted to be powered by a power source, and notably an electronic device adapted to be powered by an external source (By external source it is to be understood a source external to the electronic device).

According to an embodiment of the present disclosure, the method comprises monitoring a variation of an input voltage and/or an input current received from said power source while said electronic device is powered by said power source; and aborting, according to said monitored variation, at least one first action performed at least partially by at least one power consuming component of said electronic device.

According to an embodiment of the present disclosure, said monitoring of said variation is performed by monitoring drops in the input voltage received by said electronic device.

At least one embodiment of the present disclosure concerns a method for controlling an electronic device adapted to be powered by a power source, and notably an electronic device adapted to be powered by an external source through at least one communication interface, the method comprising aborting at least one first action performed at least partially by at least one component of said electronic device according to an input voltage received by the at least one communication interface of the electronic device.

According to an embodiment of the present disclosure, said aborting is performed when the input voltage is lower than a first value.

According to an embodiment of the present disclosure, said at least one component is a load or power consuming component.

According to an embodiment of the present disclosure, said at least one component comprises a Power amplifier of a radio frequency (RF) transmitter of said electronic device.

According to an embodiment of the present disclosure, said at least one power or load consuming component is adapted not to lead to a reset of said electronic device when disabled.

According to an embodiment of the present disclosure, said method comprises disabling temporarily said at least one component.

According to an embodiment of the present disclosure, said disabling is performed during a constant duration (or time period).

According to an embodiment of the present disclosure, said disabling is performed for a duration of a transmission of a data frame by said RF transmitter.

According to an embodiment of the present disclosure, said duration is a mean duration, a minimum duration and/or a maximum duration of a transmission of N frames by said electronic device, with N being an integer strictly greater than zero.

According to an embodiment of the present disclosure, said duration has a value independent of a current value of the monitored input voltage and/or input current.

According to an embodiment of the present disclosure, the first action is an action leading to a corrective action during which said electronic device stays in an operational state.

According to an embodiment of the present disclosure, said method comprises performing said corrective action.

According to an embodiment of the present disclosure, said method comprises generating an alert according to the input voltage.

According to an embodiment of the present disclosure, said method comprises generating an alert when the number of time the at least one first action has been aborted reaches a second value.

According to an embodiment of the present disclosure, said method comprises outputting said alert on a user interface of said electronic device.

According to an embodiment of the present disclosure, said electronic device is a communication device belonging to a communication network.

According to an embodiment of the present disclosure, said method comprises sending said alert to another device of said communication network.

According to another aspect, the present disclosure relates to an electronic device comprising at least one processor configured for:
  monitoring a variation of an input voltage and/or an input current received from a power source while said electronic device is powered by said power source; and
  aborting, according to said monitored variation, at least one first action performed at least partially by at least one power consuming component of said electronic device According to an embodiment of the present disclosure, said monitoring of said variation is performed by monitoring drops in the input voltage received by said electronic device.

According to an embodiment of the present disclosure, said electronic device comprises a power switch adapted to power said least one power consuming component and to stop powering said at least one power consuming component upon receiving an abort signal and wherein said at least one processor is configured for generating said abort signal to said power switch according to said monitored variation.

At least one embodiment of the present disclosure relates to an electronic device comprising at least one communication interface, and at least one processor, said electronic device being adapted to be powered via said at least one communication interface, said at least one processor being configured for aborting at least one first action performed at least partially by at least one component of said electronic device according to an input voltage received by the at least one communication interface of the electronic device.

According to an embodiment of the present disclosure, said aborting is performed when the input voltage is lower than a first value.

According to an embodiment of the present disclosure, said at least one component is a load consuming component.

According to an embodiment of the present disclosure, said at least one component comprises a Power amplifier of a radio frequency (RF) transmitter of said electronic device.

According to an embodiment of the present disclosure, said at least one component is adapted not to lead to a reset of said electronic device when disabled.

According to an embodiment of the present disclosure, said at least one processor is configured for disabling temporarily said at least one component.

According to an embodiment of the present disclosure, said disabling is performed during a constant duration (or time period).

According to an embodiment of the present disclosure, said disabling is performed for a duration of a transmission of a data frame by said RF transmitter.

According to an embodiment of the present disclosure, said duration is a mean duration, a minimum duration and/or a maximum duration of a transmission of N frames by said electronic device, with N being an integer strictly greater than zero.

According to an embodiment of the present disclosure, said duration has a value independent of a current value of the monitored input voltage and/or input current.

According to an embodiment of the present disclosure, the first action is an action leading to a corrective action during which said electronic device stays in an operational state.

According to an embodiment of the present disclosure, said at least one processor is configured for generating an alert according to the input voltage.

According to an embodiment of the present disclosure, said at least one processor is configured for generating an alert when the number of time the at least one first action has been aborted reaches a second value.

According to an embodiment of the present disclosure, said at least one processor is configured for outputting said alert on a user interface of said electronic device.

According to an embodiment of the present disclosure, said electronic device is a communication device belonging to a communication network and said at least one processor is configured for sending said alert to another device of said communication network.

While not explicitly described, the electronic device of the present disclosure can be adapted to perform the method of the present disclosure in any of its embodiments.

According to another aspect, the present disclosure relates to an electronic device comprising at least one processing circuitry is configured for:
    monitoring a variation of an input voltage and/or an input current received from a power source while said electronic device is powered by said power source; and
    aborting, according to said monitored variation, at least one first action performed at least partially by at least one power consuming component of said electronic device According to an embodiment of the present disclosure, said monitoring of said variation is performed by monitoring drops in the input voltage received by said electronic device.

According to an embodiment of the present disclosure, said electronic device comprises a power switch adapted to power said least one power consuming component and to stop powering said at least one power consuming component upon receiving an abort signal and said at least one processing circuitry is configured for generating said abort signal to said power switch according to said monitored variation.

At least one embodiment of the present disclosure relates to an electronic device comprising at least one communication interface, said electronic device being adapted to be powered via said at least one communication interface, at least one memory and at least one processing circuitry, said at least one processing circuitry being adapted for aborting at least one first action performed at least partially by at least one component of said electronic device according to an input voltage received by the at least one communication interface of the electronic device.

According to an embodiment of the present disclosure, said aborting is performed when the input voltage is lower than a first value.

According to an embodiment of the present disclosure, said at least one component is a load consuming component.

According to an embodiment of the present disclosure, said at least one component comprises a Power amplifier (PA) of a radio frequency (RF) transmitter of said electronic device.

According to an embodiment of the present disclosure, said at least one component is adapted not to lead to a reset of said electronic device when disabled.

According to an embodiment of the present disclosure, said at least one processing circuitry is adapted for disabling temporarily said at least one component.

According to an embodiment of the present disclosure, said disabling is performed during a constant duration (or time period).

According to an embodiment of the present disclosure, said duration is a mean duration, a minimum duration and/or a maximum duration of a transmission of N frames by said electronic device, with N being an integer strictly greater than zero.

According to an embodiment of the present disclosure, said duration has a value independent of a current value of the monitored input voltage and/or input current.

According to an embodiment of the present disclosure, said disabling is performed for a duration of a transmission of a data frame by said RF transmitter.

According to an embodiment of the present disclosure, the first action is an action leading to a corrective action during which said communication device stays in an operational state.

According to an embodiment of the present disclosure, said at least one processing circuitry is adapted for generating an alert according to the input voltage.

According to an embodiment of the present disclosure, said at least one processing circuitry is adapted for generating an alert when the number of time the at least one first action has been aborted reaches a second value.

According to an embodiment of the present disclosure, said at least one processing circuitry is adapted for outputting said alert on a user interface of said electronic device.

According to an embodiment of the present disclosure, said electronic device is a communication device belonging to a communication network and said at least one processing circuitry is adapted for sending said alert to another device of said communication network.

While not explicitly described, the electronic device of the present disclosure can be adapted to perform the method of the present disclosure in any of its embodiments.

According to another aspect, the present disclosure relates to a communication system comprising an electronic device of the present disclosure in any of its embodiments.

According to another aspect, the present disclosure relates to an electronic assembly comprising:
  a first electronic device, said first electronic device being adapted to be powered by a power source, and at least one processor;
  a second electronic device;

According to an embodiment of the present disclosure, said first electronic device is adapted to be coupled to said second electronic device and said at least one processor of said first electronic device is configured for monitoring a variation of an input voltage and/or an input current received from said power source while said first electronic device is powered by said power source; and aborting, according to said monitored variation, at least one first action performed at least partially by at least one power consuming component of said first electronic device.

According to an embodiment of the present disclosure, the present disclosure relates to an electronic assembly comprising:
  a first electronic device comprising at least one communication interface, said first electronic device being adapted to be powered by an external source, and at least one processor;
  a second electronic device;
said first electronic device being adapted to be coupled to said second electronic device;
said at least one processor of said first electronic device being configured for aborting at least one first action performed at least partially by at least one component of said first electronic device according to an input voltage received by the at least one communication interface of the first electronic device.

Depending upon embodiments, the second electronic device can be the external source of power of said first electronic device, or the first electronic device can be powered by an external source different from said second electronic device.

While not explicitly described, the electronic assembly of the present disclosure can be adapted to perform the method of the present disclosure in any of its embodiments.

While not explicitly described, the present embodiments related to a method or to the corresponding electronic device, electronic assembly or system can be employed in any combination or sub-combination.

For example, some embodiments of the method of the present disclosure can involve disabling temporarily at least one Power amplifier of at least one radio frequency (RF) transmitter of said electronic device when an input voltage received by the communication interface of the electronic device is lower than a first value. It can also comprise generating an alert when the number of time the at least one power amplifier has been disabled reaches a second value.

According to another aspect, the present disclosure relates to a non-transitory program storage product, readable by a computer.

According to an embodiment of the present disclosure, said non-transitory computer readable program product tangibly embodies a program of instructions executable by a computer to perform the method of the present disclosure in any of its embodiments.

According to an embodiment of the present disclosure, said non-transitory computer readable program product tangibly embodies a program of instructions executable by a computer for performing, when said non-transitory software program is executed by a computer, a method for controlling an electronic device adapted to be powered by an external source through at least one communication interface, the method comprising aborting at least one first action performed at least partially by at least one component of said electronic device according to an input voltage received by the at least one communication interface of the electronic device.

According to an embodiment of the present disclosure, non-transitory computer readable program product comprises program code instructions for performing, when said non-transitory software program is executed by a computer, a method adapted to be implemented in an electronic device adapted to be powered by a power source, said method comprising monitoring a variation of an input voltage and/or an input current received from said power source while said electronic device is powered by said power source; and aborting, according to said monitored variation, at least one first action performed at least partially by at least one power consuming component of said electronic device.

According to another aspect, the present disclosure relates to a computer readable storage medium carrying a software program comprising program code instructions for performing the method of the present disclosure, in any of its embodiments, when said non-transitory software program is executed by a computer.

According to an embodiment of the present disclosure, said computer readable storage medium tangibly embodies a program of instructions executable by a computer for performing, when said non-transitory software program is executed by a computer, a method for powering an electronic device adapted to be powered by an external source through at least one communication interface, the method comprising aborting at least one first action performed at least partially by at least one component of said electronic device according to an input voltage received by the at least one communication interface of the electronic device.

According to an embodiment of the present disclosure, said computer readable storage medium carry a software program comprising program code instructions for performing, when said non-transitory software program is executed by a computer, a method, adapted to be implemented in an electronic device adapted to be powered by a power source, said method comprising monitoring a variation of an input voltage and/or an input current received from said power source while said electronic device is powered by said power source; and aborting, according to said monitored variation, at least one first action performed at least partially by at least one power consuming component of said electronic device.

4. LIST OF DRAWINGS

The present disclosure can be better understood, and other specific features and advantages can emerge upon reading the following description, the description making reference to the annexed drawings wherein.

Figure 1:
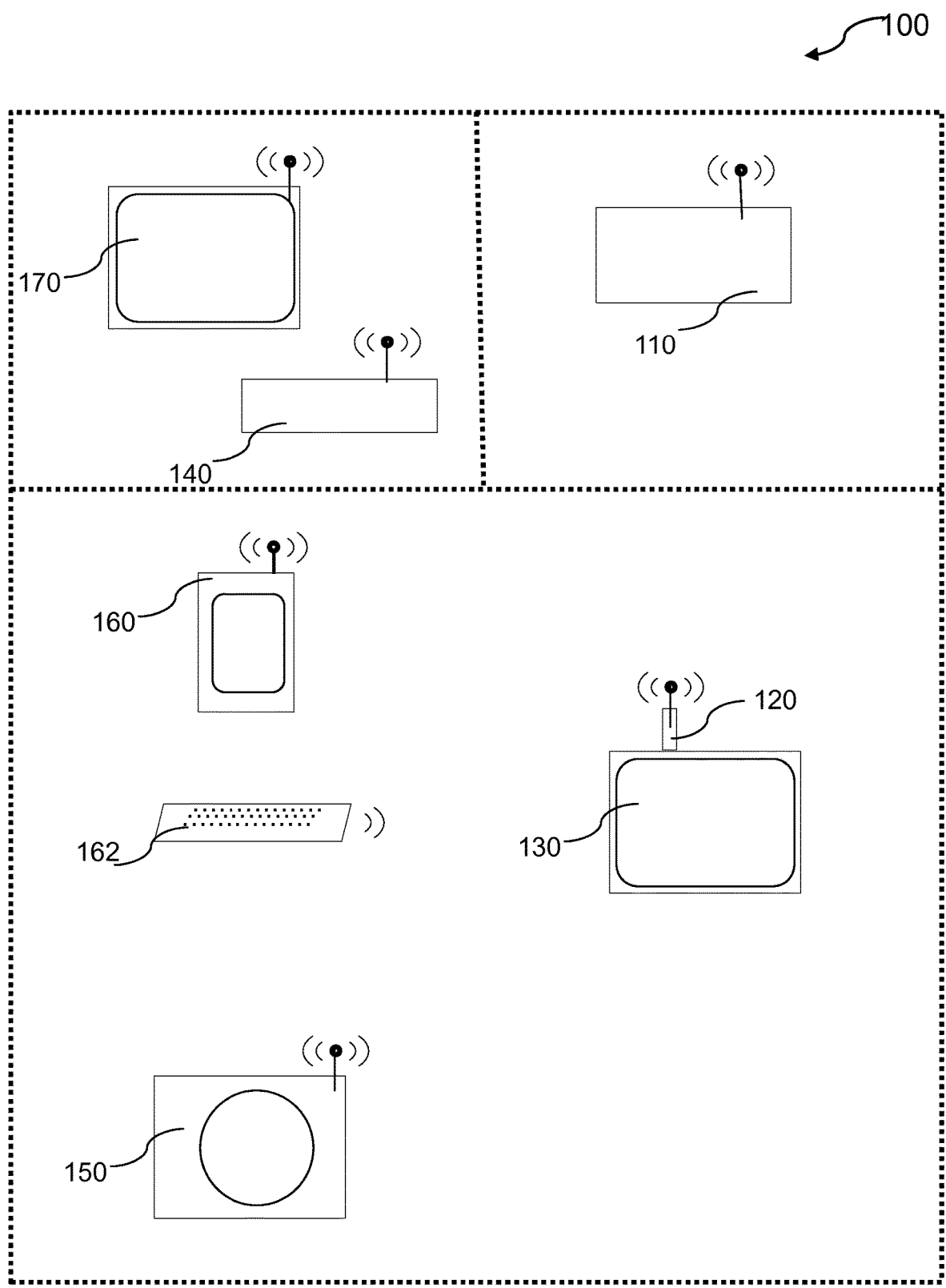
FIG. 1 shows an example of a system belonging to a wireless communication network according to an exemplary embodiment of the present disclosure.

It is to be noted that the drawings illustrate exemplary embodiments and that the embodiments of the present disclosure are not limited to the illustrated embodiments.

5. DETAILED DESCRIPTION OF THE EMBODIMENTS

The processing capabilities of a device may sometimes be insufficient for providing some technical features to a user. For instance, video processing, notably high definition video processing, can be very memory and Central Processing Unit (CPU) intensive. Thus, more and more devices (called hereafter "main" device) can be equipped with at least one complementary (or additional) device, such as one or more dongle(s)) or other removable device(s), adapted to enhance the processing capabilities of the main device or add a functionality to the main device.

Such an additional device can notably provide additional processing capabilities such as audio/video processing capabilities, like decoding capacities, and/or wireless capabilities to a main device (to which it is connected.

A complementary device is usually connected via one or more wired communication port(s) with the main device. The communication ports can be used for instance for exchanging data with the main device and/or also, for certain ports types, for the operating power of the peripheral device.

Such a communication port can be notably a port compliant to a communication interface standard, like a USB interface or an HDMI interface.

The use of a standardized communication interface obliges the device (for instance the main device or another device) supplying power to the complementary device to comply with requirements of the relevant standard. It can notably ensure a delivery to the complementary device of a minimum value of power. For instance, the USB 2.0 standard requires a minimum power delivery of 2.5 W to the complementary device (and thus a minimum voltage of 5V with a current of 500 mA) while the USB 3.0 standard ensures a minimum power delivery of 4.5 W (and thus a voltage of 5V with a current of 900 mA).

However, the power that is actually delivered to an electronic device (and for example to a complementary device) powered by an external device may vary strongly depending of the external device that is supplying power to the electronic device. In the exemplary case of a complementary device powered by a main device via a communication port, the power supplied to the complementary device can further vary depending on the port or connector to which the complementary device is connected. Notably, the power that can be obtained can be limited to a maximum value. Furthermore, some services performed by an electronic device may be very greedy in terms of power, and thus the total consumption required by the electronic device may vary strongly over the time. In peak situations, it can happen that the power delivered by a power source (being either comprised in the electronic device or external to the electronic device)

is not sufficient for facing the need of the electronic device, thus inducing some risk of disoperation of the electronic device and consequently some risk of failure of the electronic device. For instance, unexpected resets and/or reboots may happen, leading to a poor user experience. At least one embodiment of the present disclosure offers a way of limiting (or in other terms controlling) the power consumed by an electronic device powered by a power source (for instance an electronic device powered via a communication interface by an external source), in order to be compliant with the power than can be supplied to the electronic device by the source of power. Some embodiments of the present disclosure can be applied for instance for limiting the power consumed by a complementary device as described above.

The present disclosure aims to avoid situations where the electronic device consumes more than an upper limit being a maximum power consumption expected. Indeed, a consumption higher than the upper limit can lead to a voltage drop and thus to an unexpected reset of the electronic device. The limitation of the power consumption of the electronic device can notably be obtained by aborting a service (also called herein "action" or "function") currently performed by the electronic device and having a high impact on the total power consumption of the electronic device.

At least one embodiment of the present disclosure proposes to disable temporarily at least one component of the electronic device involved in such a service, and notably a component consuming power or causing power to be consumed (called hereinafter power consuming component or load consuming component) This can be for instance a software component managing the service, or invoking the service, or a hardware component of the electronic device involved in the service and being very greedy in terms of power consumption. Such a component can be notably a component the disabling of which can result in an error that can be handled operationally by the electronic device, without leading to a reset of the electronic device.

Such a component can be selected so that the impact of disabling the component is minimal on the electronic device's operation, and/or on the operation of other devices connected to or communicating with the electronic device. For example, the disabling can be performed in such a way as to increase the error rate when sending data over a communication channel—known error recovery techniques can then be applied at a receiver level (such as but not limited to front end parameter adaptation, error correction schemes, requests for frame retransmission, graceful degradation in case some errors cannot be fully corrected . . . ) or at the level of the electronic device itself (such as but not limited to resending frames when no acknowledgment of receipt is received).

Such a component can be a power amplifier of a Radio Frequency (RF) transmitter, the disabling of which will only result in transmission errors in data frames. As a transmission error can happen during a normal operation of the electronic device (because of collision for instance), such transmission errors are usually handled by the electronic device, by error recovery mechanisms like retransmission of data frames for instance. Thus, if the power amplifier is disabled, the electronic device stays in an operational state even if a corrective action (like retransmission of frames) can be performed by the electronic device In some embodiments, the disabling can be performed for a duration independent of a current value of the monitored input voltage and/or input current (and in other words not depending of a variation of the input voltage and/or the input current). Notably, the duration can be a constant value. For instance, it can be a very short duration of a few microseconds (like a duration of 5 microseconds), of less than a millisecond, or a duration of a few milliseconds (like a duration of 1, 2, or 5 milliseconds).

For instance, when the power consuming component is a power amplifier of a RF transmitter, the constant duration can correspond to a duration close or equal to a mean duration, a minimum duration and/or a maximum duration of a transmission of N frames by said electronic device, with N being an integer strictly greater than zero (like N=1, N=2, N=5 or N=10). N can be chosen so that a non-transmission of N frames will have an acceptable impact on the overall performance of the system to which the electronic device belongs.

An exemplary embodiment is now described, in connection with a communication system 100 illustrated by FIG. 1.

In the embodiment illustrated by FIG. 1, the communication system 100 is located in a domestic environment. The communication devices of the system can exchange data inside a communication network, for instance a local area network (LAN), thanks to wired communication interfaces (like Ethernet interface) or wireless communication interfaces, like WIFI® or Bluetooth® interfaces.

The communication system can notably comprise one or several gateway(s) 110, giving access to at least one other communication network, like a Wide Area Network (WAN). Notably, the gateway 110 can give access to a broadcast network or to a broadband network, like the Internet. For instance, it can receive and/or transmit data from a broadcast network (for instance from TV operators) or from/to a broadband network like the Internet. Thus, the devices of the system 100 can receive and/or transmit data, notably audiovisual data, via the gateway, from/to those other communication networks.

The communication system 100 can also include at least one other communication device, notably a communication device adapted to process an audiovisual signal, like a Set Top Box (STB) 140, a tablet 160, a PC, a smartphone, a Blu-Ray player, a TV set (130, 170), an/or an audio renderer 150.

In the embodiment illustrated in FIG. 1, the system can be distributed in different rooms of a domestic environment. For instance, the system can comprise a gateway (GW) 110 located in a first room, a first TV set 170 and a Set Top Box 140 located in a second room, and a second TV set 130 located in a third room. The TV set 130 can for instance be equipped with a complementary device 120, for instance a complementary device comprising audio and/or video processing capabilities (e.g. a decoding function), wireless communication capabilities and/or communicating with the TV set 130 using HDMI. Notably, as in the illustrated embodiment, the wireless communication means of the complementary device can be adapted to the reception and/or the transmission of an audio and/or video stream.

For instance, the complementary device 120 can be adapted to communicate with the gateway 110, in order to acquire a video stream from a Network external to the LAN network (for instance a video stream from the Internet or from a Video-On-Demand (VOD) site of a private Network). The complementary device can also acquire an audio and/or video stream from the STB 140, for instance an audio and/or video stream stored locally on the STB or an audio and/or video stream resulting from a decoding by the STB 140 from an encoded audio and/or video stream received from the gateway 110. The complementary device 120 can transmit the audio and/or video stream to the TV set 130 for its rendering.

In such an embodiment, the complementary device 120 can further transmit acknowledgment frames related to the frames of the audio and/or video stream to the gateway 110. The audio and/or video stream can be acquired for instance via a wireless interface of the complementary device. Similarly, the acknowledgment frames can be transmitted via a wireless interface of the complementary device.

In some embodiments, the complementary device 120 can transmit wirelessly an audio stream (or an audio component of an audiovisual stream) to one or several audio processing devices, like an audio rendering device 150 as illustrated by FIG. 1. Of course, the figure has also an exemplary purpose and in some embodiments, the complementary device 120 can transmit different audio and/or video streams to different processing devices.

In the exemplary embodiment of FIG. 1, the complementary device 120 (also called herein "dongle") can be controlled by a user, either directly or through the TV set, thanks to a remote-control device 162 or to an application running on a tablet 160.

Figure 2A:
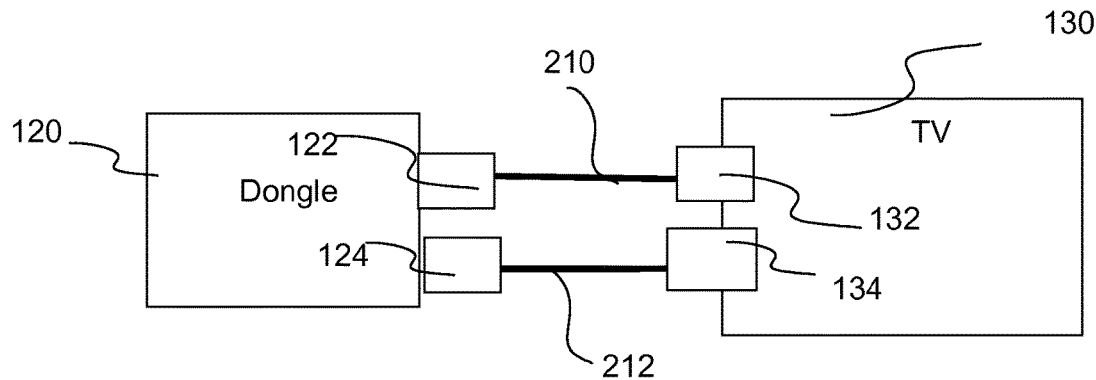
FIGS. 2A, 2B and 2C show exemplary configurations of the communication device 120 of FIG. 1.
Figure 2B:
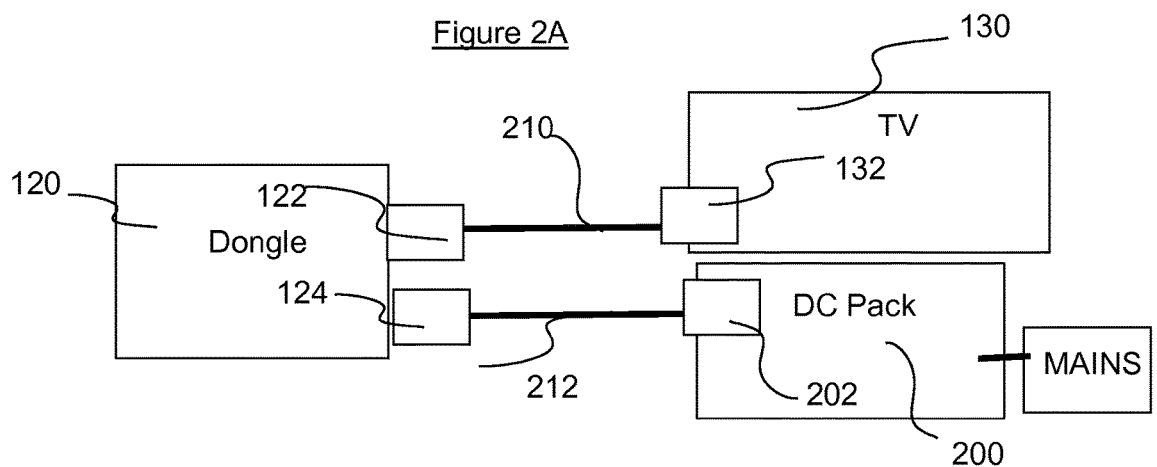
Figure 2C:
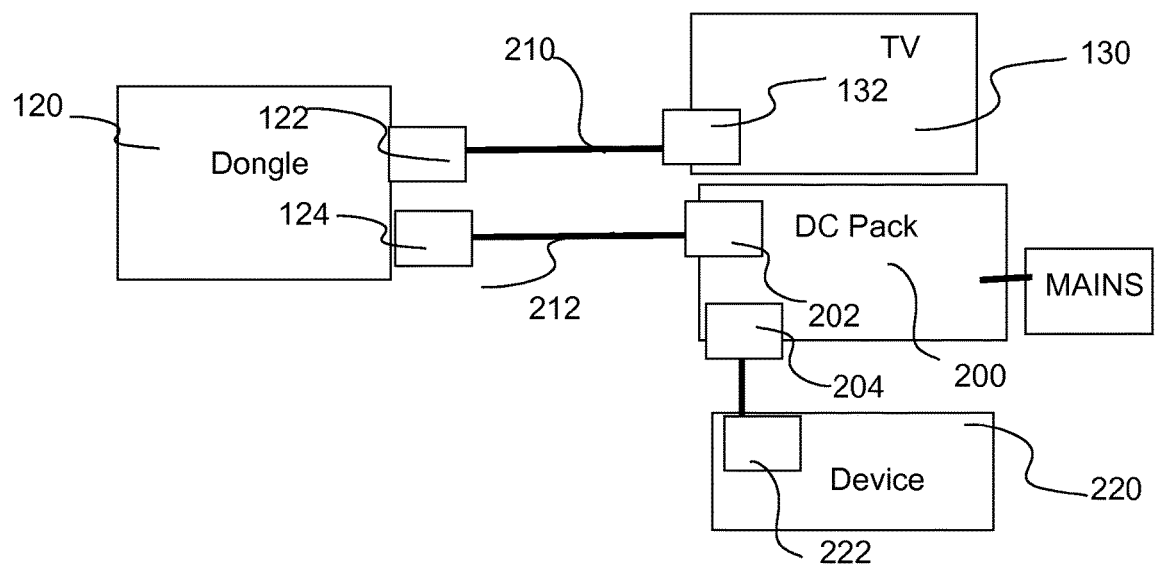

In the embodiments illustrated by FIGS. 2A, 2B and 2C, the complementary device 120 can comprise at least two communication ports. A first communication port 122 (for instance an HDMI port) can enable the complementary device 120 to exchange video data with the TV set 130. A second communication port 124 can enable the powering of the complementary device 120. Depending on the configuration of the system, the complementary device 120 can be powered, via the second communication port 124, either by the TV set 130 or by a DC power adaptor 200, for instance a power plug linked to a Mains socket. In a variant, the DC power adaptor connected to the second communication interface can further enable communication with another device of the network, via an Ethernet communication interface for instance. The communication port 124 can be a standard communication port, for instance an USB communication port. Of course, depending upon embodiments, different types of communication ports can be used. In some embodiments, where the communication port 124 is used for providing power to the complementary device 120, the communication port 124 can be also used for communication with the TV set 130.

FIG. 2A illustrates a first configuration where the dongle 120 is powered by the TV set 130. The second communication port 124 is connected (directly or via an USB cable 212) to an USB communication port 134 of the TV set 130. The first HDMI communication port 122 is connected (directly or via an HDMI cable 210) to an HDMI communication port 132 of the TV set 130.

FIG. 2B and FIG. 2C illustrate respectively a second and a third configuration similar to the configuration of FIG. 2A except that the dongle 120 is powered by an independent power plug, for instance a DC pack 200 connected to the Mains socket. The second communication port 124 is connected (directly or for instance via an USB cable 212) to an USB communication port 202 of the power plug 200. The DC adaptor can have no other connectors than its communication port connected to the dongle and its connector linked to the mains socket, as illustrated by FIG. 2B or can further comprise an USB-Ethernet module (as illustrated by FIG. 2C), enabling the dongle 120 to communicate with another device 220 of the communication network via an Ethernet cable establishing a communication path between an Ethernet interface 222 of the other device 220 and the interface 204 of the DC adaptor 200.

In configurations where the complementary device 120 is not powered using a distinct power supply but via a connection with a device such as the TV set (as illustrated by FIG. 2A), it is not necessarily possible, for the complementary device, to know or to predict the power delivery capacity via the connection, (like a TV/USB host interface). Indeed, it can depend of the type of TV set used and/or on the connector standard. For instance, in some situations, the power delivered by a TV set may be less than 2.5 W, less than 4.5 W or less than 6 W.

An electronic device (and notably the illustrated complementary device) can perform in parallel many different functions, each performed function inducing a power consumption.

For instance, an idle Central Processing Unit can induce a power consumption of 1 W, while an operating CPU can induce a power consumption of up to 3 Watts.

A decoding of a video can represent a power consumption of 1 Watt. Components of a wireless interface can also be very power consuming. For instance, a WIFI receiver can have a power consumption of 0.5 Watt while a WIFI transmitter can have a power consumption of 2 Watts.

The total power consumption of an electronic device is dependent of a simultaneous use of the different features. In the above examples, the total power consumption of the electronic device can vary between 1.5 Watts to 6 Watts.

In the illustrated embodiment, the complementary device (or dongle) 120 communicates with other devices of the communication network (notably with the gateway or with the STB) using mainly at least one wireless interface (like for instance a WIFI interface). As pointed out above, the operation of the wireless interface generates peaks of power consumption during transmission of data.

When the HDMI dongle (or "stick") is powered by a TV/USB host interface 130 (as illustrated by FIG. 2A), the power delivered by the TV/USB host interface can be sometimes too limited to face instantaneous needs of the HDMI dongle, causing a reboot of the HDMI dongle in case of over power consumption. It can be the case for instance when the dongle is receiving video data streamed from the gateway, via its wireless interface, while sending wirelessly acknowledgement frames related to this streamed audio and/or video data and decoding the received video data before transmission for display to the TV set via its HDMI interface. At the same time, the dongle can also provide some time shift functions, involving read and write access to an internal memory (not shown) storing at least part of an audio and/or video stream, and for altering the playback (or display) of the audio and/or video stream as desired by a viewer.

When the current consumed by the dongle increases, the power consumed by the dongle also increases. When the consumed power reaches the maximum power value that the main device 130 can deliver to the dongle, the input voltage received by the dongle decreases. So, the present disclosure proposes to monitor the input voltage received by the dongle, (for instance via the communication interface used for powering the dongle (like a USB interface in the illustrated embodiment)), in order to detect a risk of an imminent occurrence of power delivery failure, and to reduce immediately the power consumption of the dongle, so as to avoid the reset of the dongle.

Figure 3:
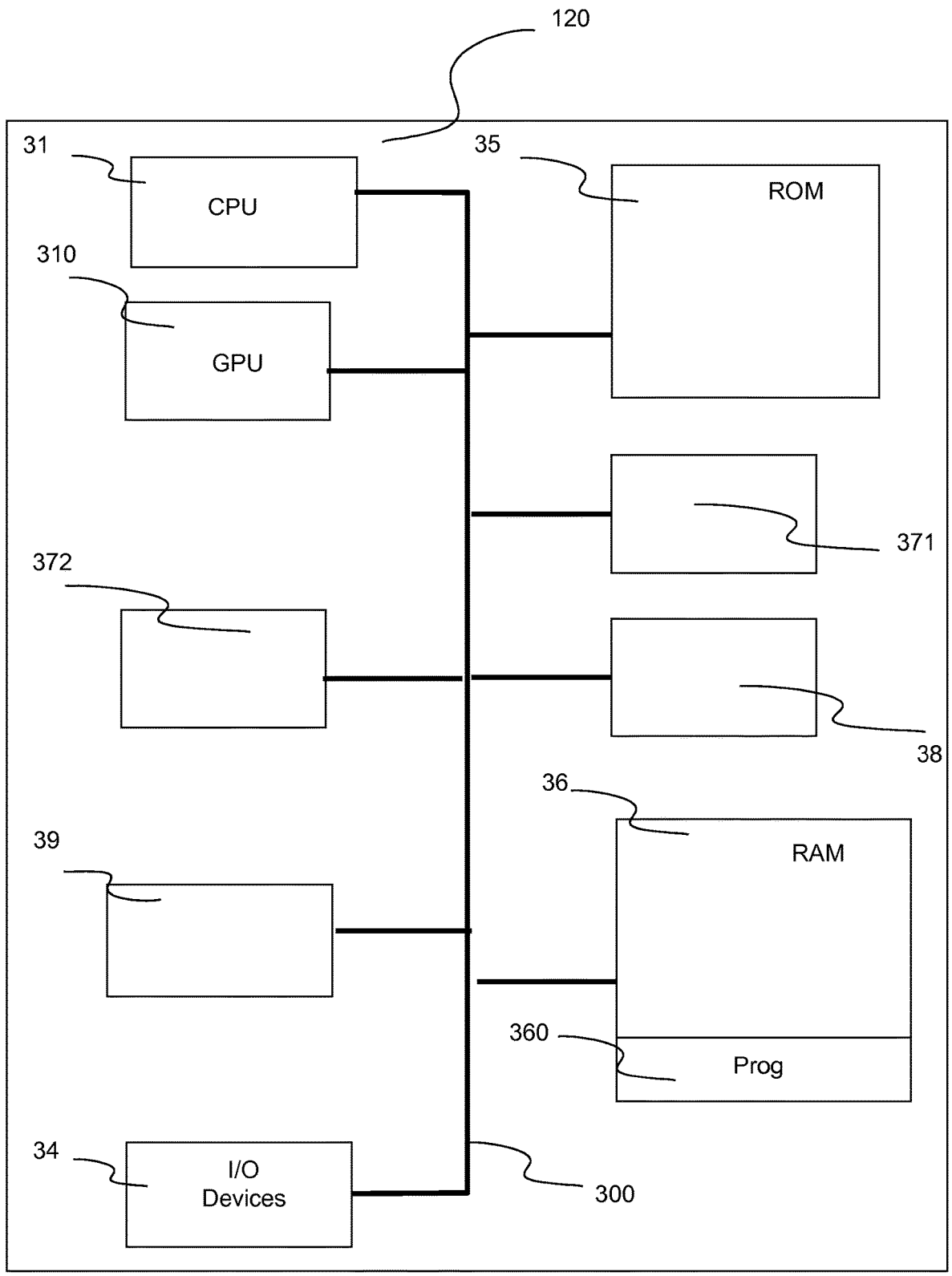
FIG. 3 illustrates an exemplary functional structure of the communication device 120 of FIG. 1.

FIG. 3 describes a functional structure of an electronic device adapted to implement the method 600 of the present disclosure. It is to be pointed out that the elements, or module, or blocks, of the functional structure illustrated of FIG. 3 can be implemented thanks to software components of the electronic device and/or thanks to hardware components of the electronic device. At least some elements illustrated by FIG. 3 can comprise both at least one software component and at least one hardware component of the electronic device.

The electronic device illustrated by FIG. 3 can be for instance a communication device, like the complementary device illustrated by FIGS. 1, and 2A to 2C. Of course, the illustrated embodiments have only an exemplary purpose and the electronic device implemented the method 600 can be a device other than a complementary device (like a main device or a standalone device).

In the exemplary embodiment of FIG. 3, the electronic device 120 can include different devices (or modules), linked together via a data and address bus 300, which can also carry a timer signal. For instance, it can include one or several micro-processors 31, 310 (or Central Processing Units (CPU)), notably a Graphic Processing Unit (GPU) 310 (Optional), at least one Input/Output module 34, (like a tactile display, a switch, a led, a button, and so on), a ROM (or «Read Only Memory») 35, a RAM (or «Random Access Memory») 36, wired communication interface(s) (38, 39). One of the wired interface(s) can for instance be an HDMI interface, enabling reception and/or transmission of video data via the HDMI communication port 122 as illustrated by FIGS. 2A to 2C, or can be an USB interface, enabling powering of the dongle via the USB communication port 124 as illustrated by FIGS. 2A to 2C. In the illustrated embodiment, the USB interface can be for instance an interface compatible with a standard like USB 2.0.

In the illustrated embodiment, the electronic device can also comprise at least one communication interface 371, 372 (like WIFI or Bluetooth® interfaces), configured for the reception and/or transmission of data via a wireless connection.

Each of the mentioned memories can include at least one register, that is to say a memory zone of low capacity (a few binary data) or high capacity (with a capability of storage of a whole program or of all or part of data representative of data to be calculated or displayed).

When the electronic device is powered on by a power source (like the TV set or an independent power plug) external to the complementary device, the microprocessor 31 loads the program instructions 360 in a register of the RAM 36, notably the processes needed for performing at least one embodiment of the method described herein, and executes the program instructions.

Depending upon embodiments, the electronic device can comprise different powering connectors adapted to be used for connecting the electronic device to an external powering source. In the exemplary embodiments of FIGS. 2A to 2C, the electronic device can be powered via the communication port 124.

According to a variant, the electronic device includes several microprocessors.

The electronic device can be adapted to implement the method 600 of the present disclosure, in one of its embodiments.

In the exemplary embodiment illustrated in FIG. 3A, the microprocessor 31 can be configured for aborting at least one first action performed at least partially by at least one component of the electronic device, notably a power consuming component of the electronic device according to an input voltage received by the electronic device.

Notably, the microprocessor 31 can be configured for:
monitoring a variation of an input voltage and/or an input current received from a power source while said electronic device is powered by said power source; and
aborting, according to said monitored variation, at least one first action performed at least partially by at least one power consuming component of said electronic device.

Figure 5:
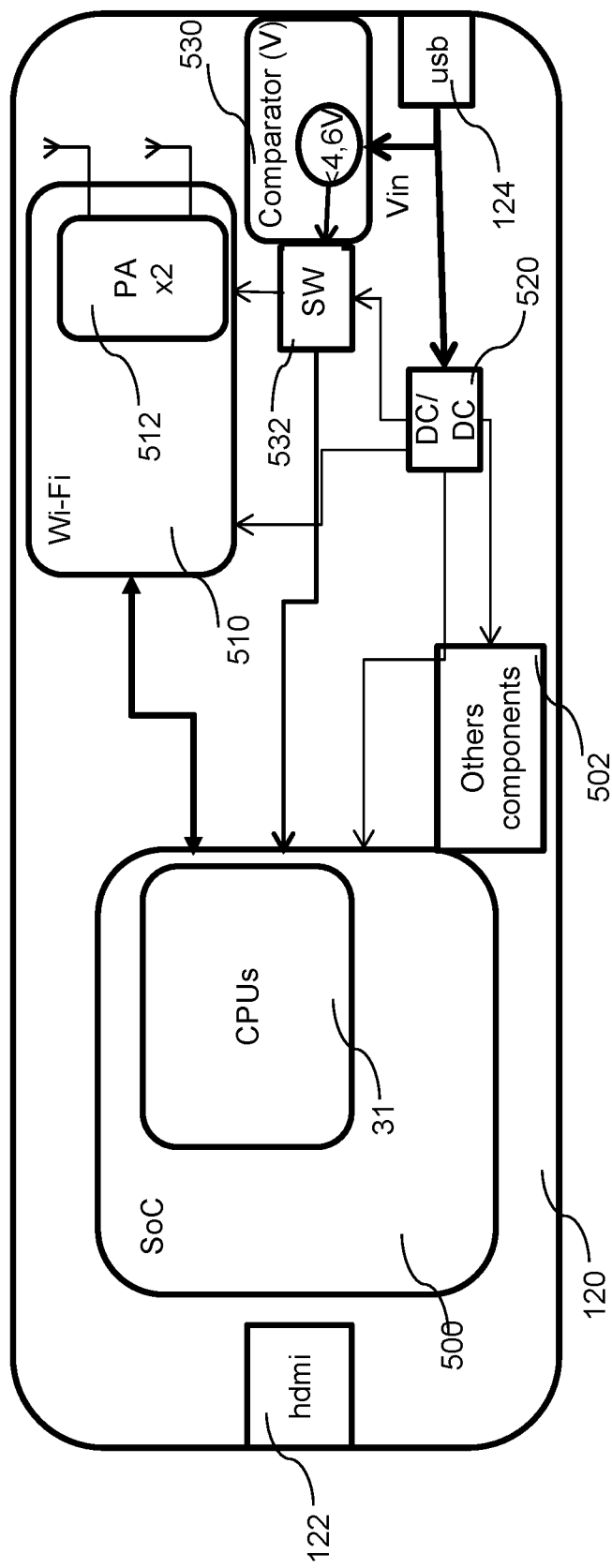
FIG. 5 illustrates an exemplary detailed structure of the communication device 120 of FIG. 1.

FIG. 5 describes an exemplary implementation of the functional structure illustrated by FIG. 3, the electronic device being the complementary device 120 of FIG. 1. According to FIG. 5, the complementary device 120 can comprise at least two communication ports: a first communication port 122 (for instance an HDMI port) can enable the complementary device 120 to exchange video data with the TV set 130 and a second communication port 124 that can enable the powering of the complementary device 120 by an external power source. The communication port 124 can be a standard communication port, for instance an USB communication port. Of course, depending upon embodiments, different types of powering ports and/or different types of communication ports can be used.

In the exemplary embodiment of FIG. 5, the complementary device can also comprise a smart component being a System On Chip (SoC) Unit 500. The SoC 500 notably comprise a timer module, at least one CPU 31 and at least one memory as described in connection with FIG. 3. The complementary device 120 can further comprise at least one Direct Current/Direct Current (DC/DC) Component 520 in charge of delivering voltage to the SoC 500, to at least one WIFI module (or chipset) 510, to at least one power switch SW 532 that controls at least one power amplifier of the at least one WIFI chipset 510 and to other components 502 of the complementary device 120. Those other components (collectively represented by element 502 in FIG. 5) can notably include memories (for instance at least one Read Only Memory (ROM) memory like a Flash memory, at least one Random Access Memory (RAM) memory like a Double Data Rate (DDR) RAM memory), one or several Input and/or Output Interfaces (like a tactile display, a switch, a led, a button, and so on), one or several Network Interfaces and so on.

In the illustrated embodiment, the Power amplifiers of the WIFI chipset are powered via the power switch 532, while the other parts of the WIFI chipset are powered via the DC/DC component 520. This specific powering, by means of two distinct components (and/or by two distinct powering paths) can allow to disable the powering of at least one of the power amplifiers while continuing powering the other components of the WIFI chipset.

In the illustrated embodiment, the voltage $V_{in}$ delivered to the communication device 120 via the USB port 124 is monitored by a comparator 530 in order to compare the delivered voltage $V_{in}$ to a given voltage value (or threshold value) $V_1$ (for instance a voltage value belonging to a range from 4.4 to 4.8V, for instance 4.6 V as illustrated). The comparator outputs a signal according to a comparison result between $V_{in}$ and $V_1$ to the at least one power switch 532 which in turn enables or disables the at least one power amplifier accordingly.

Figure 4:
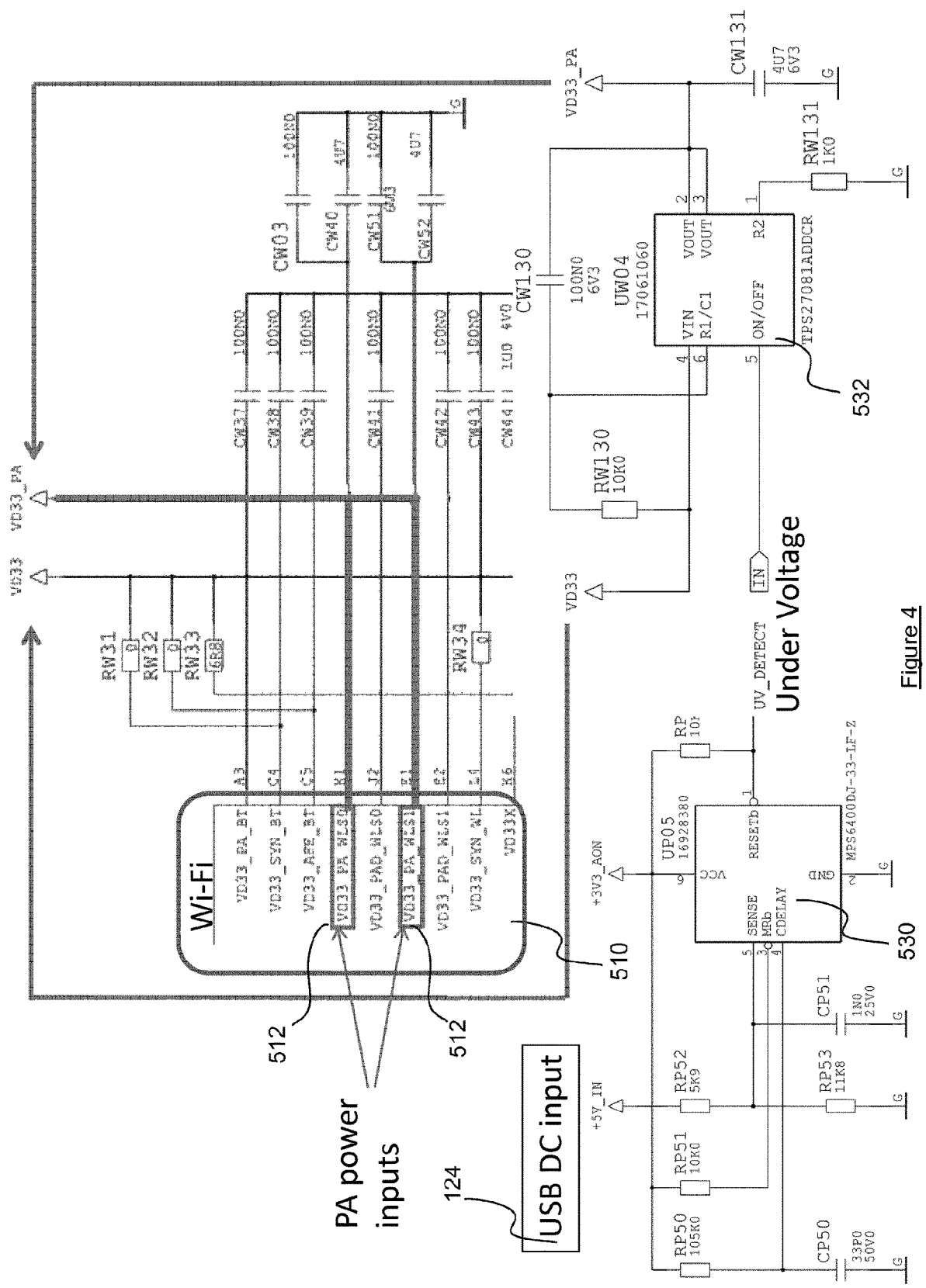
FIG. 4 illustrates an exemplary partial Hardware schematic view of the communication device 120 according to an embodiment of the present disclosure, including a comparator and a Power switch.

FIG. 4 illustrates a partial hardware schematic view of the exemplar hardware implementation of FIG. 5, including the USB communication port 124, the comparator 530, the power switch 532 and the WIFI chipset 510 of FIG. 5.

FIG. 4 also represents some other components (notably some resistor(s) and capacitor(s)) of the complementary device 120. Some of those components can be chosen according to a requirement for a specific threshold value (or first value) V1 (for instance a value around 4.65 V in the illustrated embodiment) and/or for a specific duration of the disabling signal to be transmitted to the power switch (as illustrated by element 750 of FIG. 7E).

Figure 8:
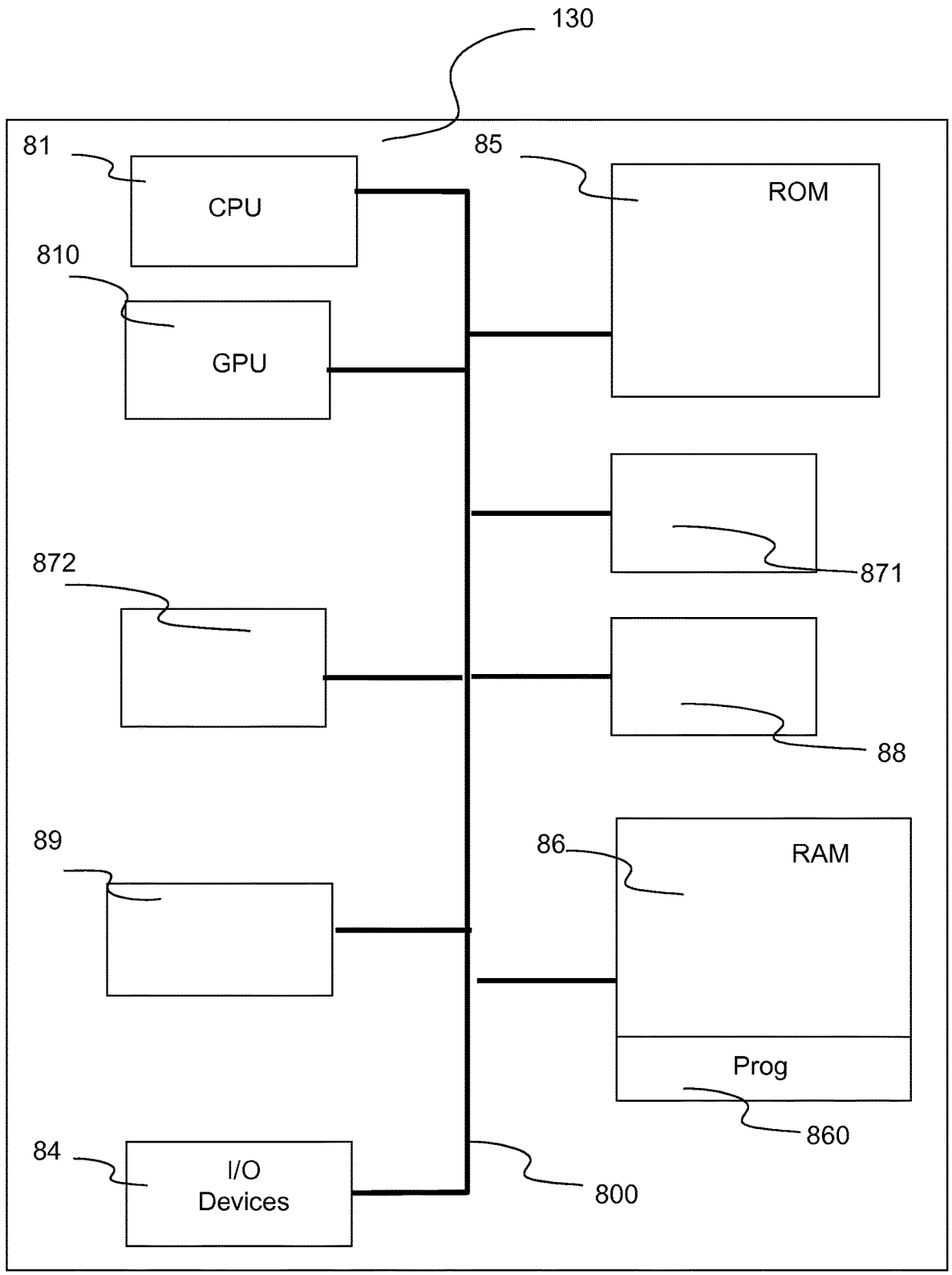
FIG. 8 illustrates an exemplary functional structure of the communication device 130 of FIG. 1.

FIG. 8 illustrates the structure of an electronic device like the TV set 130 illustrated by FIG. 1, to which the electronic device 120 can be connected, thus constituting an electronic assembly. In the exemplary embodiment of FIG. 8, the electronic device 130 can include different devices (or modules), linked together via a data and address bus 800, which can also carry a timer signal. It can include one or several micro-processors 81, 810 (or Central Processing Units (CPU)), for instance a Graphic Processing Unit (GPU) 810 (Optional)

The electronic device 130 can also include at least one Input/Output module 84, a ROM (or «Read Only Memory») 85, a RAM (or «Random Access Memory») 86, wired communication interface(s) (88, 89). One of the wired interface(s) can for instance be an HDMI interface, enabling reception and/or transmission of video data via the HDMI communication port of the TV set 130, or an USB interface, enabling for instance powering of the dongle 120 via an USB communication port 124 of the dongle. In the illustrated embodiment, the USB interface can be for instance an interface compatible with a standard like USB 2.0 or USB 3.0.

In the illustrated embodiment, the electronic device 130 can also comprise at least one communication interface 871, 872 (like WIFI or Bluetooth® interfaces), configured for the reception and/or transmission of data via a wireless connection.

Those communication interfaces are optional in some embodiments.

Each of the mentioned memories can include at least one register, that is to say a memory zone of low capacity (a few binary data) or high capacity (with a capability of storage of a whole program or of all or part of data representative of data to be calculated or displayed).

When the electronic device 130 is powered on, the CPU 81 loads program instructions stored in the ROM 85 in at least one register 860 of the RAM 86.

The electronic device 130 can also comprise a power source.

Figure 6:
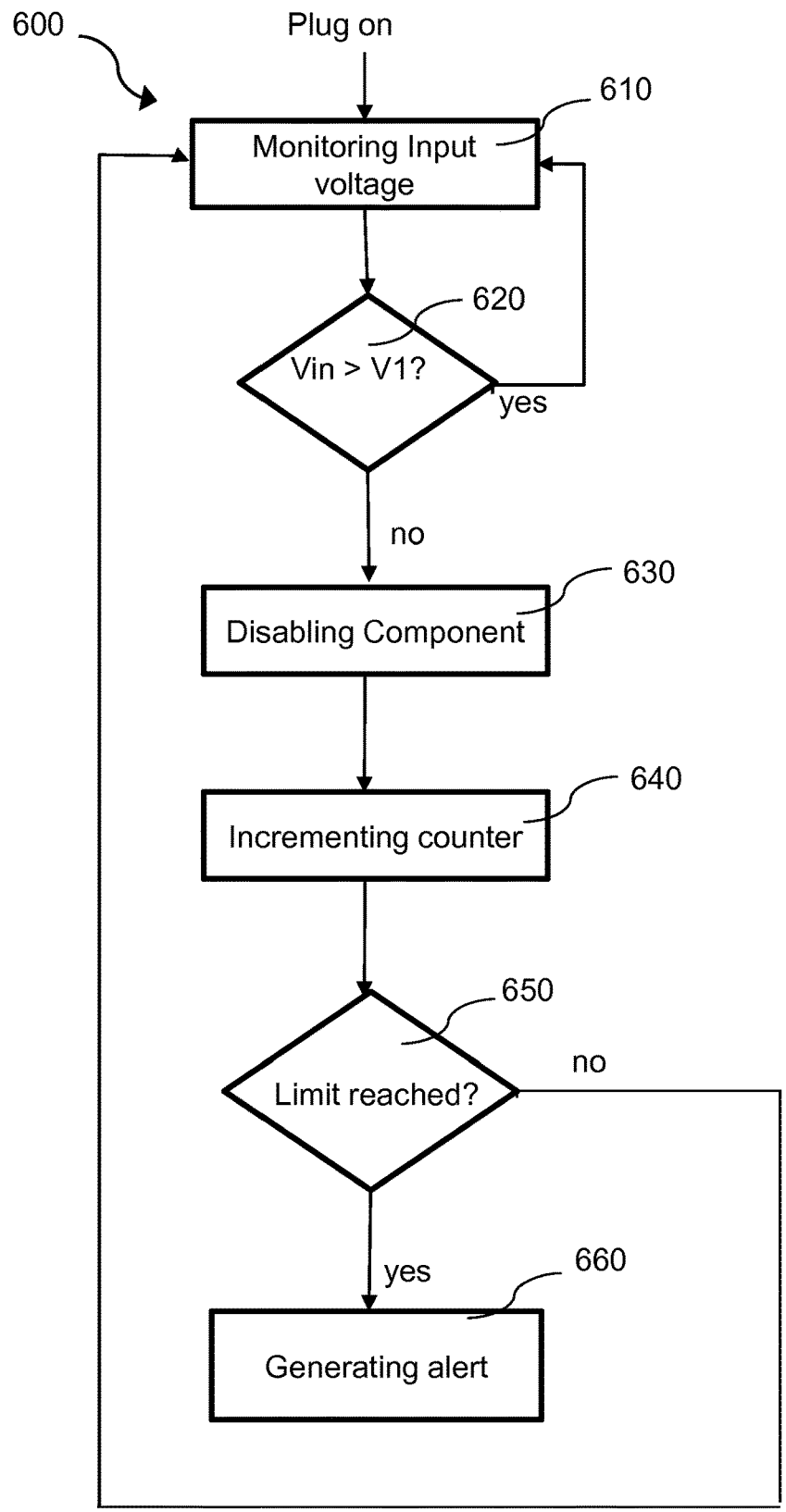
FIG. 6 illustrates an embodiment of the method of the present disclosure performed, for instance, in the communication device 120 of FIG. 1.

FIG. 6 shows an exemplary embodiment of the method 600 of the present disclosure implemented in an electronic device.

Depending upon embodiments, the electronic device can be a standalone device, powered by the Mains (via a power source integrated in the electronic device), or a device coupled to another device and powered by the other device or by an external source of power different from the other device. In the exemplary embodiment of FIG. 6, the method 600 of the present disclosure is implemented in the complementary device (or dongle) 120 of FIGS. 1, 2A, 2B, 2C and 3.

According to the illustrated embodiment, upon the powering up of the complementary device 120 (for instance by connecting the complementary device 120 with the TV set 130), the method can comprise monitoring 610 a voltage $V_{in}$ received via the communication port 124 of the complementary device 120. The monitoring can for instance be performed thanks to a dedicated HW circuitry as illustrated by FIG. 5. This monitoring can be performed continuously, to detect as soon as possible at least one critical fall (or in other words critical drop) of the input voltage.

The method can also comprise comparing 620 the input voltage $V_{in}$ to a voltage limit $V_1$. This comparing can for instance be performed by a voltage comparator 530 of the hardware circuitry as illustrated by FIG. 5.

The voltage limit can be a voltage value lower than the nominal voltage value that is to be delivered by the USB communication port. The first value can notably be chosen to be higher than a critical value at which a reboot of the complementary device occurs. For instance, when the USB communication port is compliant with USB 2.0 standard and delivers a minimum current intensity of 500 mA (or a power of 2.5 W), the first value can be set to 4.65 V if a reboot may occur at 4.5V.

The value assigned to the voltage limit can be obtained by different ways, depending upon embodiments. For instance, it can be read from a memory of the dongle (for instance in the ROM 33) or obtained from a user interface of the dongle. It can also be defined by the characteristics of the hardware components constituting the voltage comparator 530.

When the input voltage is lower than the voltage value V1, the method can comprise disabling 630 a component of the dongle. In the illustrated embodiment, the method can comprise disabling at least one power amplifier (PA) of at least one WIFI interface of the complementary device 120. In some embodiments, all power amplifiers of all WIFI interfaces of the complementary device 120 can be disabled. In other embodiments, only a part of the power amplifiers of at least one WIFI interface of the complementary device 120 can be disabled. For instance, only one power amplifier of each WIFI interface can be kept enabled. In such an embodiment, a frame can still be transmitted but with less power than when all the power transmitters are enabled. Thus, it may be not received by some receiver or Access Point of the system 100.

In the embodiment illustrated by FIG. 8 for instance, when the input voltage becomes less than the first voltage value (for instance 4.6V), the voltage comparator 530 can control directly a power switch SW 532 that is powering the power amplifiers 512 of the WIFI interface 510.

As explained above, the total power consumption of an electronic device varies over the time depending of the tasks currently performed (notably concurrently) by the electronic device. Peaks of current consumption leading to a voltage critical fall can correspond to rare situations where many features are performed together (for instance simultaneously). Such situations can often occur within a very short time interval. Indeed, the CPU activity of the electronic device can be highly variant upon the software tasks performed by the electronic device.

In some situations; for instance in situations described above where the electronic device is the complementary device 120 and transmit acknowledgement frames to a gateway, the WIFI transmission activity is can be very short (for instance, less than a few milliseconds, like less than 1 ms, 1 ms, or 2 ms). As the wireless transmission is very greedy in terms of power, forcing an inactivity of the wireless transmission means (or at least strongly reducing its activity) during a peak of current consumption can be a good way of decreasing efficiently and almost immediately the current consumption of the communication device.

Of course, depending upon embodiments, different components can be disabled. However, disabling momentarily a wireless transmission offers the advantage of not having a great impact on the execution of the software processes running on the dongle.

For instance, in the illustrated embodiment, where the method can comprise disabling at least one power amplifier of at least one WIFI interface, the disabling of the at least one power amplifier can be adjusted to only impact the current WIFI frame transmission. More precisely, the disabling of the power amplifiers will be seen, by the software processes monitoring the WIFI interfaces of the dongle, as a lost frame event. Losing a frame because of collision during a transmission may happen from time to time. Losing a few more frames because of the disabling of the power amplifier (this happening usually in very rare situations) does not have much impact on the global WIFI link performance. Furthermore, wireless protocols (for instance WIFI protocols based on methods like Carrier Sense Multiple Access with Collision Avoidance (CSMA-CA) method) comprise mechanisms adapted to manage the loss of frames, like error recovery mechanisms and are thus robust to loss of frames.

The impact of the disabling of WIFI power amplifiers on the complementary device 120 of FIG. 1 when the complementary device is in an operational state will now be described in more details in link with FIGS. 7A to 7E.

Figure 7:
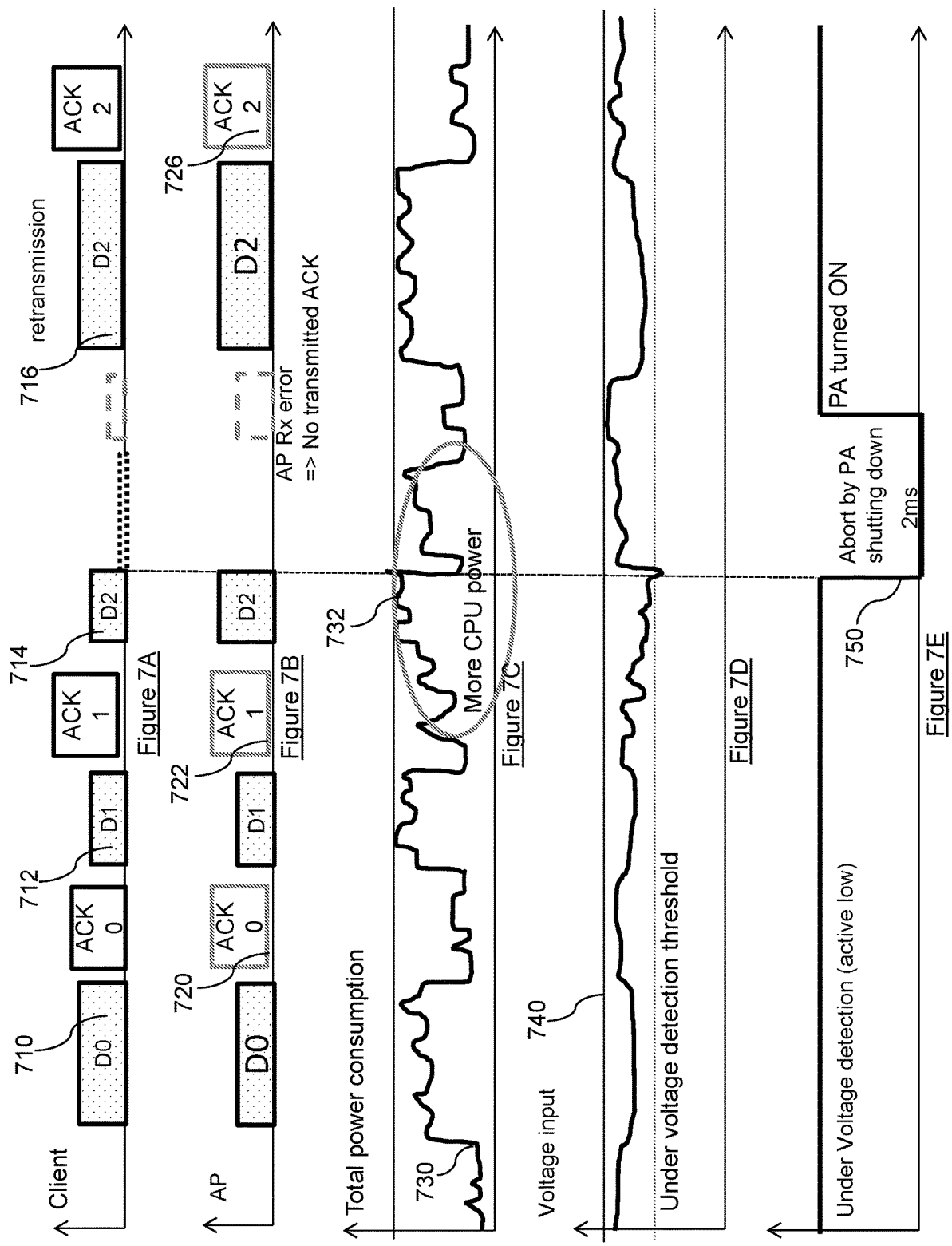
FIGS. 7A and 7B represent some frames exchanged between a Wi-Fi chipset, acting as a Wi-Fi client, of the communication device 120 of FIG. 1 and a Wi-Fi access point (AP) of another device of the system 100 during a given period of time.
FIGS. 7C and 7D represents respectively the total power consumption of the communication device 120 of FIG. 1 and the evolution of the voltage input to the communication device 120 of FIG. 1, during the same period of time.
FIG. 7E illustrates the signal output by the comparator to the power switch that controls the power of the Wi-Fi power amplifier during the same period of time.

FIG. 7A represents the frame transmitted by a WIFI chipset, acting as a WIFI client, of the dongle and the corresponding acknowledgment (ACK) frames received by the WIFI client during a given time period. Receiving an acknowledgment for a transmitted frame can enable the WIFI client to be sure that the transmitted frame has been received by its recipient. Indeed, it can happen (for instance because of collision with another frame) that a frame is not received by its intended recipient.

FIG. 7B represents the same transmitted and received frames but from the point of view of a WIFI interface (like an access point (AP)) of another device, being the intended recipient of the frames D0 and D1.

FIGS. 7C and 7D represents respectively, during the same time period, the total power consumption of the dongle and the evolution of the voltage input to the dongle.

FIG. 7E illustrates the signal output by the comparator to the power switch that controls the WIFI PA power during the same time period.

As shown by FIGS. 7A, 7B and 7C, during transmission 710, 712 of frames D0 and D1 from the WIFI client of the dongle to the WIFI access point, the power consumption 730 of the dongle increases. The input voltage 740 varies accordingly (see FIG. 7D).

While the input voltage 740 is not too low (or, in other words, is high enough), there is no issue. After the reception of frames D0 and D1, the AP acknowledges the reception of a data frame 710, 712 by sending 720, 722 an acknowledgment (ACK) frame.

During the transmission 714 of the frame D2, the CPU is busier (for instance, it has begun decoding a video (or video content) and transmitting the decoded video to the TV set via the HDMI interface) and thus is consuming more power. Thus, the total power consumption can increase (as illustrated by element 732 of FIG. 7C) and, which the power consumption reaches the maximum power value that can be delivered by the TV set, the input voltage can decrease. When the input voltage reaches the minimum limit value V1 (or in other words crosses the minimum threshold 742), the illustrated embodiment can comprise disabling at least one power transmitter of the WIFI client. More precisely, an abort signal 750 can be generated to the power switch which in turn stops powering the power amplifier. Thus, the transmission 714 of the frame D2 by means of the power amplifier can be almost stopped. The wireless signal is not amplified anymore and thus has a very short coverage.

FIG. 7A shows in dotted line the part of the frame D2 that is not amplified by the power amplifier.

The abort signal can be maintained for a time duration, like a constant duration (for instance 1 millisecond or 2 milliseconds, as illustrated by FIG. 7E). Then the signal output to the power switch returns to the inactive state and, consequently, the power amplifier can be turned on again by the power switch.

In the illustrated embodiment, the WIFI chipset is not informed of the power abort action on the power amplifier. Indeed, the WIFI client can just detect that it has not received an acknowledgement corresponding to the frame D2 from the access point, and therefore, the WIFI client can perform a corrective action, like an action comprising notably repeating the transmission 716 of the D2 frame. This time, the access point (being the intended recipient) can receive the D2 frame and can acknowledge 726 the receiving of the frame.

As can be appreciated by the one skilled in the art, the momentary disabling of the power amplifier does not impact much the operation of the complementary device. Indeed, the retransmission of the frame D2 does not engender a noticeable shift of the transmission time, from the point of view of a user of the complementary device, while avoiding one or more undesirable rebooting of the complementary device. Furthermore, losing a frame is a situation often anticipated by a communication device when it is operating. Thus, a corrective action (including a retransmission of the frame) can be planned in case of an occurrence of such a situation by the communication device (usually by its software components) while the complementary device stays in its operational state.

Thus, embodiments of the present disclosure can enable to preserve the operational behavior of the HDMI dongle during stressed periods and thus help improving the user experience of the dongle.

The present disclosure has been detailed in link with a WIFI chipset acting as a WIFI client. It is to be pointed out that the present disclosure can also apply to a WIFI chipset acting as an Access Point.

The present disclosure has been detailed in link with a disabling of the power amplifiers performed without informing the WIFI chipset of the dongle. In other embodiments, the abort signal can be transmitted to the WIFI chipset. In such an embodiment, the WIFI chipset can disable the power amplifier during the duration of a frame transmission (for instance a mean duration). In some embodiment, the power amplifier can be disabled for a duration of less than a duration of a frame transmission.

In some embodiments, the method 600 can further comprise monitoring the frequency of the voltage drops (or in other words falls), notably voltage drops below the first "threshold" value, to alert a user and/or an authorized person about a "risky" configuration of the device.

In the exemplary embodiment illustrated, the complementary device can be powered either by a DC pack, either by a TV set (as depicted above in link with FIGS. 2A to 2C). A configuration where the complementary device is powered by the TV set (as illustrated by FIG. 2A) is more likely to be less robust to peaks of current consumption than a configuration with a powering by a DC pack (as illustrated by FIGS. 2B and 2C), as the maximum power that can be delivered to the complementary device can depend on the TV set. In the embodiment of FIG. 6, the method can comprise incrementing 640 a counter each time a critical voltage decrease is detected (and/or the abort signal is generated). For instance, the abort signal 750 can also be sent to a General-Purpose Input/Output (GPIO) port of the CPU and can then be written into a register of the CPU, in order to increment the counter. The method can further comprise comparing 650 the current value of the counter to a limit value. In some embodiments, the counter value can be an absolute value, representing the total number of critical voltage detections since the first boot, the current boot and/or the more recent boot of the communication device. In other embodiments, the counter value can represent a number of critical voltage detections (like critical decreases) since a reference time (for instance on a daily basis), or during a sliding time period (or in other words sliding time window) (for instance the last hour). In such embodiments, the method can comprise periodic reset of the counter.

When the counter reaches the limit value, the method can comprise generating 660 an alert, for instance to a user interface of the complementary device, and/or by updating a log file in a memory of the complementary device and/or by sending an alerting message to another device (for instance the TV set 130 or the tablet 160) via a communication port of the complementary device. Such an alerting message can for instance be delayed not to increase the power consumption and/or be transmitted once the power amplifier is enabled again. In the illustrated embodiment for instance, such an alert can comprise informing a user of complementary device that the power configuration is not appropriate and recommending the use of another power source (like the DC pack) rather than the TV set for instance.

Depending upon embodiments, the alert can be generated just when the counter reaches the limit value, or once the counter has reached the limit value, each time a voltage decrease happens, or periodically.

The present disclosure has been described in relation with exemplary protocols. Of course, as it can be understandable by a person skilled in the art, the present disclosure can also be applied to a communication system using other communication protocols, notably communication protocols not related to USB, HDMI and/or WIFI standards.

As can be appreciated by one skilled in the art, aspects of the present principles can be embodied as a system, method, or computer readable medium. Accordingly, aspects of the present disclosure can take the form of a hardware embodiment, a software embodiment (including firmware, resident software, micro-code, and so forth), or an embodiment combining software and hardware aspects that can all generally be referred to herein as a "circuit", "module" or "system". Furthermore, aspects of the present principles can take the form of a computer readable storage medium. Any combination of one or more computer readable storage medium may be utilized.

A computer readable storage medium can take the form of a computer readable program product embodied in one or more computer readable medium and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing.

It is to be appreciated that the following, while providing more specific examples of computer readable storage media to which the present principles can be applied, is merely an illustrative and not exhaustive listing as is readily appreciated by one of ordinary skill in the art: a portable computer diskette, a hard disk, a read-only memory (ROM), an erasable programmable read-only memory (EPROM or Flash memory), a portable compact disc read-only memory (CD-ROM), an optical storage device, a magnetic storage device, or any suitable combination of the foregoing.

Thus, for example, it can be appreciated by those skilled in the art that the block diagrams presented herein represent conceptual views of illustrative system components and/or circuitry of some embodiments of the present principles. Similarly, it can be appreciated that any flow charts, flow diagrams, state transition diagrams, pseudo code, and the like represent various processes which may be substantially represented in computer readable storage media and so executed by a computer or processor, whether such computer or processor is explicitly shown.

While not explicitly described, the present embodiments related to a method or to the corresponding electronic device, electronic assembly or system can be employed in any combination or sub-combination.

The invention claimed is:

1. A method, adapted to be implemented in an electronic device configured to be powered by a power source, the method comprising:
    monitoring a variation of an input voltage and/or of an input current received from the power source while the electronic device is powered by the power source;
    transmitting, by a Radio Frequency (RF) transmitter of the electronic device configured for data communication with at least one other electronic device, data frames to the at least one other electronic device at a first amplification level;
    disabling, during the transmitting data frames by the RF transmitter, according to the monitored variation, at least one power amplifier of the RF transmitter, for a duration determined by a duration of at least one data frame transmission by the RF transmitter to the at least one other electronic device;
    transmitting, during the determined duration, data frames by the RF transmitter at a second amplification level lower than the first amplification level due to the disabling of the at least one power amplifier of the RF transmitter; and
    upon detecting that at least one data frame, transmitted by the RF transmitter during the duration of the disabling, was not received by the at least one other electronic device, retransmitting, by the RF transmitter, the at least one data frame not received by the at least one other electronic device.

2. The method of claim 1 wherein the monitoring of the variation is performed by monitoring drops in the input voltage received by the electronic device.

3. The method according to claim 1, wherein the electronic device further comprises at least one power switch for providing power to the at least one power amplifier, the method further comprising controlling the at least one power switch according to the monitored variation.

4. The method according to claim 1, further comprising performing the disabling when the input voltage is lower than a first value.

5. The method according to claim 1, further comprising performing the disabling for a duration corresponding to a transmission of N frames.

6. An electronic device comprising at least one processor configured to:
    monitor a variation of an input voltage and/or of an input current received from a power source while the electronic device is powered by the power source;
    transmit, using a Radio Frequency (RF) transmitter of the electronic device configured for communication with at least one other electronic device, data frames to the at least one other electronic device at a first amplification level;
    disable, during the transmission of data frames by the RF transmitter, according to the monitored variation, at least one power amplifier of the RF transmitter, for a duration determined by a duration of at least one frame transmission by the RF transmitter to the at least one other electronic device;
    transmit, during the determined duration, data frames by the RF transmitter at a second amplification level lower than the first amplification level due to the disabling of the at least one power amplifier of the RF transmitter; and
    upon detecting that at least one data frame, transmitted by the RF transmitter during the duration of the disabling, was not received by the at least one other electronic device, retransmit, by the RF transmitter, the at least one data frame not received by the at least one other electronic device.

7. The electronic device of claim 6,
    wherein the electronic device comprises at least one power switch configured to control power of the at least one power amplifier, and
    wherein the at least one processor is configured to control the at least one power switch according to the monitored variation.

8. The electronic device of claim 6, wherein the disabling is performed when the input voltage is lower than a first value.

9. The electronic device of claim 6, wherein the disabling is performed for a duration corresponding to a transmission of N frames.

10. An electronic assembly comprising:
- a first electronic device, the first electronic device being configured to be powered by a power source, and comprising at least one processor;
and
- the at least one processor of the first electronic device being configured to:
  - monitor a variation of an input voltage and/or of an input current received from the power source while the first electronic device is powered by the power source;
  - transmit, by a Radio Frequency (RF) transmitter of the first electronic device configured for data communication with at least one other electronic device, data frames to the at least one other electronic device at a first amplification level;
  - disable, during the transmission of data frames by the RF transmitter, according to the monitored variation, at least one power amplifier of the RF transmitter, for a duration determined by a duration of at least one frame transmission by the RF transmitter to the at least one other electronic device;
- transmit, during the determined duration, data frames by the RF transmitter at a second amplification level lower than the first amplification level due to the disabling of the at least one power amplifier of the RF transmitter; and
  - upon detecting that at least one data frame, transmitted by the RF transmitter during the duration of the disabling, was not received by the at least one other electronic device, retransmit, by the RF transmitter, the at least one data frame not received by the at least one other electronic device.

11. The electronic assembly according to claim 10, further comprising:
- a second electronic device,
- wherein the first electronic device is configured to be coupled to the second electronic device, and
- wherein the second electronic device is different from the at least one other electronic device.

12. An electronic device, the electronic device configured to be powered by a power source, comprising at least one processor and a memory, the memory storing instructions operable, when executed by the at least one processor, to cause the electronic device to:
- monitor a variation of an input voltage and/or of an input current received from the power source while the electronic device is powered by the power source;
- transmit, by a Radio Frequency (RF) transmitter of the electronic device configured for data communication with at least one other electronic device, data frames to the at least one other electronic device at a first amplification level;
- disable, during the transmission of data frames by the RF transmitter, according to the monitored variation, at least one power amplifier of the RF transmitter, for a duration determined by a duration of at least one frame transmission 1a the RF transmitter to the at least one other electronic device;
- transmit, during the determined duration, data frames by the RF transmitter at a second amplification level lower than the first amplification level due to the disabling of the at least one power amplifier of the RF transmitter; and
- upon detecting that at least one data frame, transmitted by the RF transmitter during the duration of the disabling, was not received by the at least one other electronic device, retransmit, by the RF transmitter, the at least one data frame not received by the at least one other electronic device.

13. A non-transitory computer readable storage medium having stored thereon instructions operative, when executed by at least one processor, to cause the at least one processor to:
- monitor a variation of an input voltage and/or of an input current received from a power source while an electronic device configured to be powered by the power source is powered by the power source;
- transmit, by a Radio Frequency (RF) transmitter of the electronic device configured for data communication with at least one other electronic device, data frames to the at least one other electronic device at a first amplification level;
- disable, during the transmission of data frames by the RF transmitter, according to the monitored variation, at least one power amplifier of the RF transmitter, for a duration determined by a duration of at least one frame transmission by the RF transmitter to the at least one other electronic device;
- transmit, during the determined duration, data frames by the RF transmitter at a second amplification level lower than the first amplification level due to the disabling of the at least one power amplifier of the RF transmitter; and
- upon detecting that at least one data frame, transmitted by the RF transmitter during the duration of the disabling, was not received by the at least one other electronic device, retransmit, by the RF transmitter, the at least one data frame not received by the at least one other electronic device.

* * * * *